UNITED STATES PATENT OFFICE.

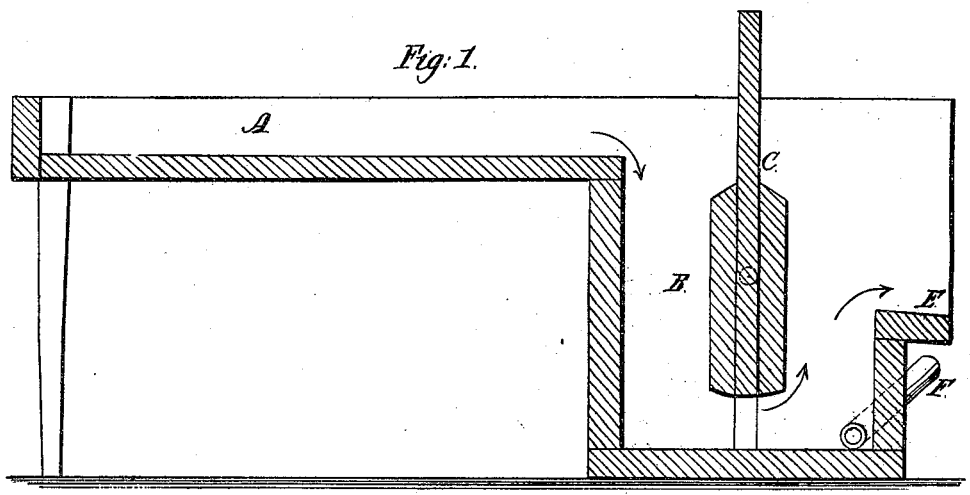
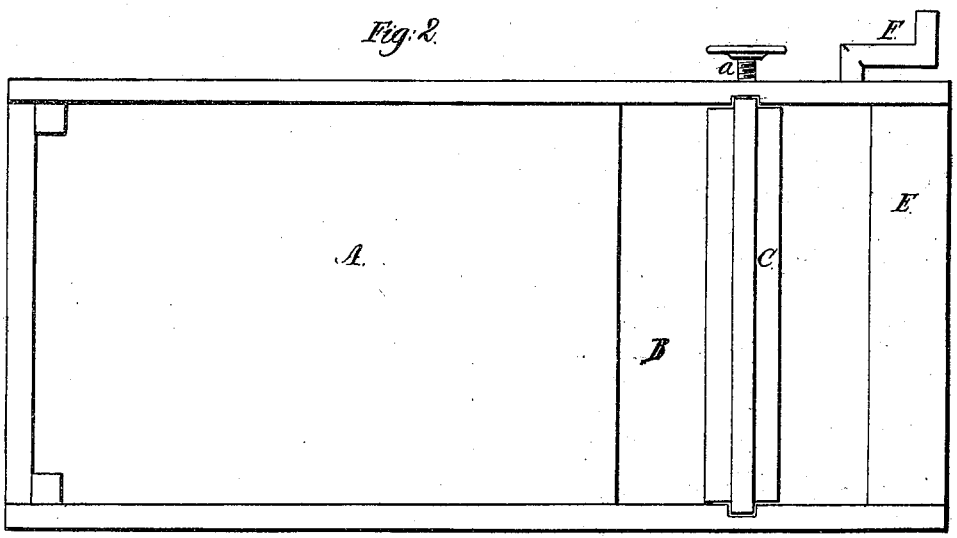

DANIEL FRANKLIN HAWKES, OF TIMBUCTOO, CALIFORNIA.

IMPROVED APPARATUS FOR SEPARATING GOLD FROM SAND.

Specification forming part of Letters Patent No. 95,472, dated October 5, 1869.

*To all whom it may concern:*

Be it known that I, DANIEL F. HAWKES, of Timbuctoo, county of Yuba, State of California, have invented an Improved Apparatus for Separating Gold from Sand, &c.; and I do hereby declare the following description and accompanying drawings are sufficient to enable any person skilled in the art or science to which it most nearly appertains to make and use my said invention or improvements without further invention or experiment.

The object of my invention is to provide an improved apparatus for separating gold from the sand and gravel in the process of cleaning up flumes in hydraulic claims, tailing flumes, and other places where the pan is used; and it consists of a square box or tank having a perpendicular sliding gate which moves up and down across its center, dividing the tank, when down, into two sections. The water and tailings or dirt to be washed are received into this tank on one side and pass under the gate and through a body of quicksilver in the bottom of the tank, and the water is discharged at the opposite side, at a point lower than where it enters.

To more fully illustrate and explain my invention, reference is had to the accompanying drawings and letters marked thereon, forming a part of this specification, of which—

A represents a section of a flume, through which the water carrying the tailings or dirt is conveyed into the separator or tank B. Across the center of this tank is a sliding gate or partition, C, which may be raised or lowered as desired, and held at any required height by means of a set-screw, a, on the outside of the tank. The tank is charged with quicksilver to within an inch or two of the point of discharge, and the gate C set so that its lower edge will be a little below the surface of the quicksilver. The lower portion of the gate C is made thicker at the bottom than at the top, and the lower edge is rounded or beveled, so that when the debris or fine gravel and sand rise after being precipitated to the bottom of the tank they will do so gradually, and not scatter or disintegrate the mercury. After passing under the gate and through the quicksilver the water and sand are carried off at the opposite side over the apron E, which is lower than the point where it enters the tank, in order to give a head sufficiently great to insure the passage of the sand under the gate.

Thus the body of sand or dirt and gravel are compelled to pass through a body of quicksilver, the gold being held by the mercury at the bottom while the sand and water pass off. The amalgam is retained in the tank, and an adjustable pipe, F, enters the tank near its bottom and carries off the quicksilver as it accumulates, thus regulating its height in the tank so that the pressure is constant. By this device the auriferous sands are carried, not over the surface, but through the body of mercury, so as to subject each particle to its action and increase the certainty of its amalgamating.

Having thus described my invention, what I claim, and desire to secure by Letters Patent, is—

1. The tank B, with the adjustable sliding gate C, having its lower edge rounded or beveled and standing beneath the surface of the mercury, the whole constructed and arranged substantially as herein described.

2. In combination with the quicksilver-tank B and the beveled adjustable gate C, the curved adjustable discharge-pipe F, for regulating and maintaining the height of the mercury, substantially as described.

In witness whereof I have hereunto set my hand and seal.

DANIEL FRANKLIN HAWKES. [L. S.]

Witnesses:
 ALBERT SAUNDERS,
 R. S. CRARY.